United States Patent Office
3,629,476
Patented Dec. 21, 1971

3,629,476
CONTROLLING SOIL-DWELLING FUNGI WITH PHENARSAZINE COMPOUNDS
John P. Pellegrini, Jr., O'Hara Township, Allegheny County, and Harold O. Strange, Penn Hills Township, Allegheny County, Pa., assignors to Gulf Research & Development Company, Pittsburgh, Pa.
No Drawing. Original application Dec. 30, 1965, Ser. No. 517,808, now Patent No. 3,481,958, dated Dec. 2, 1969. Divided and this application Apr. 1, 1969, Ser. No. 812,342
Int. Cl. A01n 9/00
U.S. Cl. 424—297
8 Claims

ABSTRACT OF THE DISCLOSURE

Soil-dwelling fungi are controlled by impregnating the soil with a phenarsazine compound represented by the general formula

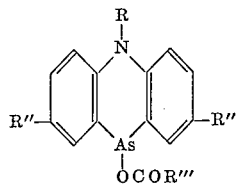

Preferred compounds are those wherein R and R" are hydrogen and R''' is selected from the group consisting of alkyl and alkenyl radicals containing 3 to 9 carbon atoms, phenyl, hydroxyphenyl, alkylphenyl and phenalkyl radicals the alkyl portions of said alkylphenyl and phenalkyl radicals containing 1 to 2 carbon atoms. Especially preferred is 5,10-dihydrophenarsazine-10-isooctanoate.

This application is a division of our copending application Ser. No. 517,808, filed Dec. 30, 1965, now Pat. No. 3,481,958.

This invention relates to a method for controlling soil-dwelling fungi, and more particularly to novel phenarsazine compounds which are useful as fungicides to control soil-dwelling fungi.

Fungi are low forms of plant life which, lacking chlorophyll and being incapable of manufacturing their own food, live off other plants or animals. Thus, fungi are parasitic organisms many of which inhabit the soil and subsist on other living plants. If allowed to go unmolested, soil fungi can cause seed rot, injure plant roots and other underground parts of desirable plants and, in general, interfere with healthy plant development. When fungi invade a plant and become established therein, the plant is regarded as being diseased.

Fungi which cause seed rot include *Phythium aphanidermatum, Fusarium culmorum* and *Rhizoctonia solani.* These fungi live in most agricultural soils since they compete successfully for space with other soil saprophytes. They are stimulated in growth by organic matter around germinating seed. If seed germination or seedling development is delayed by excessive moisture or low temperatures, the fungi may invade the seed or surround the young shoot before the plant can properly be established.

Various methods of combatting fungi that inhabit the soil have been employed, but the control of fungi is a problem that has not been entirely solved. Crop rotation, the elimination of weeds that may serve as hosts for disease organisms and the planting of resistant seed varieties has met with some success in reducing crop loss from fungi, but these methods have not been completely satisfactory. Seed coatings have been used to prevent seed decay and to protect seedlings near the seed ball, but the protection offered by seed coatings diminishes rapidly as the roots and young shoots extend beyond the immediate area of the seed. Soil fumigation has been used to reduce plant disease; however, the degree of success with soil fumigation is dependent upon many variables including the texture of the soil, the moisture content of the soil, the temperature of the soil and the uniformity of the fumigation. In addition to these exacting conditions required with soil fumigation, fumigants are frequently toxic to desirable plants and thus should be substantially diffused from the soil prior to planting the desired plants.

We have discovered a group of phenarsazine compounds that are particularly useful as fungicides when incorporated in a fungi-infested soil. Thus, there are provided by this invention novel phenarsazine compounds, a fungicidal composition comprising said novel phenarsazine compounds, seed coated with said phenarsazine compounds, a method for controlling soil-dwelling fungi which comprises impregnating soil with said phenarsazine compounds as well as soil treated wtih said phenarsazine compounds.

The phenarsazine compounds which are useful according to this invention have the following general formula:

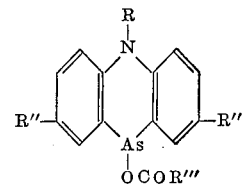

wherein R is a substituent selected from the group consisting of hydrogen, alkyl radicals containing from 1 to 4 carbon atoms and R'CO— radicals; R' is selected from the group consisting of alkyl radicals containing from 1 to 7 carbon atoms and phenyl radicals; R" is selected from the group consisting of hydrogen and alkyl radicals containing from 1 to 12 carbon atoms; and R''' is selected from the group consisting of alkyl and alkenyl radicals containing from 2 to 11 carbon atoms and phenyl, hydroxyphenyl, alkylphenyl, alkoxyphenyl, phenalkyl, phenoxyalkyl and alkylphenoxyalkyl radicals wherein the alkyl portions of said alkylphenyl, alkoxyphenyl, phenalkyl, phenoxyalkyl and alkylphenoxyalkyl radicals contain from 1 to 12 carbon atoms. In the above formula, the R" radicals can be alike or different. Examples of compounds having the above structural formula include 5,10-dihydrophenarsazine-10-propionate
5,10-dihydrophenarsazine-10-propenoate
5,10-dihydrophenarsazine-10-butyrate
5,10-dihydrophenarsazine-10-isobutyrate
5,10-dihydrophenarsazine-10-crotonate
5,10-dihydrophenarsazine-10-valerate
5,10-dihydrophenarsazine-10-isovalerate
5,10-dihydrophenarsazine-10-pivalate
5,10-dihydrophenarsazine-10-[4-pentenoate]
5,10-dihydrophenarsazine-10-hexanoate
5,10-dihydrophenarsazine-10-isohexanoate
5,10-dihydrophenarsazine-10-[2-hexenoate]
5,10-dihydrophenarsazine-10-octanoate
5,10-dihydrophenarsazine-10-isooctanoate
5,10-dihydrophenarsazine-10-nonanoate
5,10-dihydrophenarsazine-10-decanoate
5,10-dihydrophenarsazine-10-isodecanoate
5,10-dihydrophenarsazine-10-[9-decenoate]
5,10-dihydrophenarsazine-10-undecanoate
5,10-dihydrophenarsazine-10-[10-undecenoate]
5,10-dihydrophenarsazine-10-dodecanoate
5,10-dihydrophenarsazine-10-isododecanoate 5,10-dihydrophenarsazine-10-[10-dodecenoate]
5,10-dihydrophenarsazine-10-benzoate
5,10-dihydrophenarsazine-10-salicylate
5,10-dihydrophenarsazine-10-[p-toluate]
5,10-dihydrophenarsazine-10-[2,5-dimethylbenzoate]
5,10-dihydrophenarsazine-10-[2,4,6-trimethylbenzoate]
5,10-dihydrophenarsazine-10-[p-ethylbenzoate]
5,10-dihydrophenarsazine-10-[p-isopropylbenzoate]
5,10-dihydrophenarsazine-10-[p-butylbenzoate]
5,10-dihydrophenarsazine-10-[p-isoamylbenzoate]
5,10-dihydrophenarsazine-10-[p-n-hexylbenzoate]
5,10-dihydrophenarsazine-10-[p-n-heptylbenzoate]
5,10-dihydrophenarsazine-10-[p-isooctylbenzoate]
5,10-dihydrophenarsazine-10-[p-methoxybenzoate]
5,10-dihydrophenarsazine-10-[p-ethoxybenzoate]
5,10-dihydrophenarsazine-10-[p-isopropoxybenzoate]
5,10-dihydrophenarsazine-10-[p-n-butoxybenzoate]
5,10-dihydrophenarsazine-10-[p-isoamyloxybenzoate]
5,10-dihydrophenarsazine-10-[p-n-hexoxybenzoate]
5,10-dihydrophenarsazine-10-[p-n-heptoxybenzoate]
5,10-dihydrophenarsazine-10-[p-isooctoxybenzoate]
5,10-dihydrophenarsazine-10-phenylacetate
5,10-dihydrophenarsazine-10-phenylisopropanoate
5,10-dihydrophenarsazine-10-phenylbutyrate
5,10-dihydrophenarsazine-10-phenylisovalerate
5,10-dihydrophenarsazine-10-phenylhexanoate
5,10-dihydrophenarsazine-10-phenylisooctanoate
5,10-dihydrophenarsazine-10-phenyldodecanoate
5,10-dihydrophenarsazine-10-phenoxyacetate
5,10-dihydrophenarsazine-10-phenoxyisopropanoate
5,10-dihydrophenarsazine-10-phenoxybutyrate
5,10-dihydrophenarsazine-10-phenoxyisovalerate
5,10-dihydrophenarsazine-10-phenoxyhexanoate
5,10-dihydrophenarsazine-10-phenoxyisooctanoate
5,10-dihydrophenarsazine-10-phenoxydodecanoate
5,10-dihydrophenarsazine-10-methylphenoxyacetate
5,10-dihydrophenarsazine-10-methylphenoxyisopropanoate
5,10-dihydrophenarsazine-10-methylphenoxybutyrate
5,10-dihydrophenarsazine-10-methylphenoxyisovalerate
5,10-dihydrophenarsazine-10-methylphenoxyhexanoate
5,10-dihydrophenarsazine-10-methylphenoxyisooctanoate
5,10-dihydrophenarsazine-10-methylphenoxydodecanoate
5,10-dihydrophenarsazine-10-ethylphenoxyacetate
5,10-dihydrophenarsazine-10-n-propylphenoxyacetate
5,10-dihydrophenarsazine-10-n-butylphenoxyacetate
5,10-dihydrophenarsazine-10-isoamylphenoxyacetate
5,10-dihydrophenarsazine-10-n-hexylphenoxyacetate
5,10-dihydrophenarsazine-10-n-heptylphenoxyacetate
5,10-dihydrophenarsazine-10-isooctylphenoxyacetate
5,10-dihydrophenarsazine-10-dodecylphenoxyacetate
5,10-dihydrophenarsazine-5-methyl-10-butyrate
5,10-dihydrophenarsazine-5-methyl-10-isooctanoate
5,10-dihydrophenarsazine-5-methyl-10-isododecanoate
5,10-dihydrophenarsazine-5-methyl-10-benzoate
5,10-dihydrophenarsazine-5-methyl-10-salicylate
5,10-dihydrophenarsazine-5-methyl-10-[p-toluate]
5,10-dihydrophenarsazine-5-methyl-10-[p-methoxybenzoate]
5,10-dihydrophenarsazine-5-methyl-10-phenylacetate
5,10-dihydrophenarsazine-5-methyl-10-phenoxyacetate
5,10-dihydrophenarsazine-5-methyl-10-methylphenoxyisooctanoate
5,10-dihydrophenarsazine-5-ethyl-10-butyrate
5,10-dihydrophenarsazine-5-ethyl-10-isooctanoate
5,10-dihydrophenarsazine-5-ethyl-10-isododecanoate
5,10-dihydrophenarsazine-5-ethyl-10-benzoate
5,10-dihydrophenarsazine-5-ethyl-10-salicylate
5,10-dihydrophenarsazine-5-ethyl-10-[p-toluate]
5,10-dihydrophenarsazine-5-ethyl-10-[p-methoxybenzoate]
5,10-dihydrophenarsazine-5-ethyl-10-phenylacetate
5,10-dihydrophenarsazine-5-ethyl-10-phenoxyacetate
5,10-dihydrophenarsazine-5-ethyl-10-methylphenoxyisooctanoate
5,10-dihydrophenarsazine-5-n-propyl-10-butyrate
5,10-dihydrophenarsazine-5-n-propyl-10-isooctanoate
5,10-dihydrophenarsazine-5-n-propyl-10-isododecanoate
5,10-dihydrophenarsazine-5-n-propyl-10-benzoate
5,10-dihydrophenarsazine-5-n-propyl-10-salicylate
5,10-dihydropenarsazine-5-n-propyl-10-[p-toluate]
5,10-dihydrophenarsazine-5-n-propyl-10-[p-methoxybenzoate]
5,10-dihydrophenarsazine-5-n-propyl-10-phenylacetate
5,10-dihydrophenarsazine-5-n-propyl-10-phenoxyacetate
5,10-dihydrophenarsazine-5-n-propyl-10-methylphenoxyisooctanoate
5,10-dihydrophenarsazine-5-n-butyl-10-butyrate
5,10-dihydrophenarsazine-5-n-butyl-10-isooctanoate
5,10-dihydrophenarsazine-5-n-butyl-10-isododecanoate
5,10-dihydrophenarsazine-5-n-butyl-10-benzoate
5,10-dihydrophenarsazine-5-n-butyl-10-salicylate
5,10-dihydrophenarsazine-5-n-butyl-10-[p-toluate]
5,10-dihydrophenarsazine-5-n-butyl-10-[p-methoxybenzoate]
5,10-dihydrophenarsazine-5-n-butyl-10-phenylacetate
5,10-dihydrophenarsazine-5-n-butyl-10-phenoxyacetate
5,10-dihydrophenarsazine-5-n-butyl-10-methylphenoxyisooctanoate
5,10-dihydrophenarsazine-5-acetyl-10-isooctanoate
5,10-dihydrophenarsazine-5-octanoyl-10-isooctanoate
5,10-dihydrophenarsazine-5-benzoyl-10-isooctanoate
5,10-dihydrophenarsazine-2-methyl-10-isooctanoate
5,10-dihydrophenarsazine-2,8-dimethyl-10-isooctanoate
5,10-dihydrophenarsazine-2,8-diisooctyl-5-acetyl-10-isooctanoate While all of the above phenarsazine compounds can be used as soil fungicides, it will be understood, of course, that their effectiveness mary vary. Especially good results are obtained with phenarsazine compounds represented by the structural formula shown hereinabove wherein R and R″ are hydrogen and R‴ is selected from the group consisting of alkyl and alkenyl radicals containing from 3 to 9 carbon atoms, especially branched-chain alkyl radicals and phenyl, hydroxyphenyl, alkylphenyl and phenalkyl radicals wherein the alkyl portions of said alkylphenyl and phenalkyl radicals contain from 1 to 2 carbon atoms. Specific examples of compounds within the preferred group of phenarsazine compounds are:

5,10-dihydrophenarsazine-10-isobutyrate
5,10-dihydrophenarsazine-10-crotonate
5,10-dihydrophenarsazine-10-pivalate
5,10-dihydrophenarsazine-10-octanoate
5,10-dihydrophenarsazine-10-isooctanoate
5,10-dihydrophenarsazine-10-decanoate
5,10-dihydrophenarsazine-10-benzoate
5,10-dihydrophenarsazine-10-salicylate
5,10-dihydrophenarsazine-10-[p-toluate]
5,10-dihydrophenarsazine-10-phenylacetate The method of treating soil in order to control soil-dwelling fungi according to the invention comprises impregnating the soil with a fungicidal amount of the phenarsazine compound. This can be accomplished by applying the phenarsazine compound to the seed furrow as the seed is planted or by thoroughly mixing the phenarsazine compound with the soil prior to planting the seed. Other methods for applying the phenarsazine compound to the soil so as to impregnate the soil therewith includes the use of a diluent or carrier. Thus, for example, the phenarsazine compound can be admixed with an inert material such as talc, clay, diatomaceous earth, sawdust, calcium carbonate, and the like. The mixture is then incorporated into the soil. The phenarsazine compound can also be admixed with an inert liquid such as kerosene, acetone, benzene, toluene, xylene and the like in which the phenarsazine compound may be dissolved or dispersed. If desired, emulsifying agents and/or wetting agents can be used to obtain stable fungicidal compositions. Such solutions or dispersions can then be sprayed or otherwise applied to the soil. Also, in accordance with the invention, seeds can be coated with a fungicidal amount of the phenarazine compound.

The phenarsazine compounds according to the invention can be utilized in admixture with plant nutrients including compounds of calcium, magnesium, nitrogen, sulfur, phosphorus and potassium and with the so-called "trace elements" manganese, iron, zinc, copper, nickel, cobalt, boron, molybdenum and vanadium, if desired. In addition, the phenarsazine compounds can be applied in admixture with insecticides and other fungicides.

The amount of the phenarsazine compound employed to control fungi in soil infested therewith will depend upon a number of factors including the extent of the infestation, the uniformity of the application and the particular phenarsazine compound employed. In general, suitable rates of application to the soil to control soil-dwelling fungi are about 2 to about 200 pounds of the phenarsazine compound per acre of ground. Preferably an application rate of about 3 to about 40 pounds per acre is used. In any event, the amount of the phenarsazine compound applied to the soil is a small amount sufficient to control fungi dwelling in the soil.

The phenarsazine compounds used in the present invention can be prepared by reacting a phenarsazine-10-oxide having the structural formula

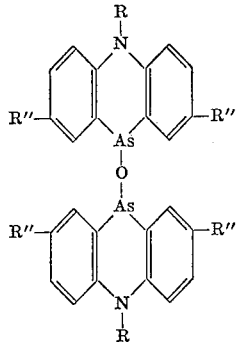

wherein R and R" are as defined hereinabove with the appropriate carboxylic acid. The molecular ratio of the carboxylic acid to the phenarsazine oxide is preferably about 2 to 1, carboxylic acid to phenarsazine oxide, respectively. Thus, a phenarsazine-10-oxide having the above structural formula can be reacted with acids selected from the group consisting of alkanoic, alkenoic, benzoic, hydroxybenzoic, alkylbenzoic, alkoxybenzoic, phenylalkanoic, phenoxyalkanoic, alkylphenoxyalkanoic acids and the like. Examples of specific acids within this group include propionic, propenoic, butyric, isobutyric, crotonic, valeric, isovaleric, pivalic, 4-pentenoic, caproic, isohexanoic, 2-hexenoic, heptanoic, caprylic, isooctanoic, pelargonic, capric, decenoic, undecanoic, 10-undecenoic, lauric, dodecenoic, benzoic, salicylic, toluic, ethoxybenzoic, phenylacetic, phenylpropanoic, phenoxyacetic and methylphenoxyvaleric acids.

The reaction between the phenarsazine-10-oxide and the carboxylic acid is preferably conducted at the reflux temperature of the reactants. The reaction is continued until no more water is formed. Upon completion of the reaction and precipitation of the phenarsazine product, the product is filtered and dried. The phenarsazine product is soluble to various degrees in organic solvents such as benzene, toluene, xylene, chloroform, dimethylsulfoxide and dimethylformamide.

Phenarsazine-10-oxide can be prepared by known chemical procedure. For example, about equal parts by weight of diphenylamine, orthodichlorobenzene and arsenic trichloride can be boiled in a glass flask equipped with a reflux condenser. Upon cooling the reaction mass, a product comprising diphenylamine chlorarsine (Adamsite) is obtained. About equal molar portions of sodium hydroxide in water and diphenylamine chlorasine in acetone are then admixed at about 50° C. to give 50—50 acetone-water mixture whereupon a product comprising phenarsazine-10-oxide is obtained. This product is filtered and dried. The phenarsazine-10-oxide thus obtained melts at a temperature greater than about 350° C.

According to another embodiment, the phenarsazine compounds used in the present invention can be prepared by refluxing a phenarsazine chloride with a sodium salt of the appropriate carboxylic acid. The synthesis of phenarsazine compounds will be demonstrated by the following specific illustrative examples.

EXAMPLE I (5,10-dihydrophenarsazine-10-isooctanoate)

A mixture of 317 grams (2.2 moles) of isooctanoic acid and 500 grams (1.0 mole) of 10,10'-oxybis (5,10-dihydrophenarsazine) [phenarsazine-10-oxide] dispersed in 2.5 liters of toluene was stirred and refluxed at about 110° C. in a flask connected to a reflux condenser by means of a Dean-Stark trap. The reaction was continued until all the water of reaction was collected in the trap. The dark brown solution which resulted was filtered and the toluene was removed under vacuum. The dark oil obtained was shaken with 3 liters of hexane, precipitating a yellow-tan solid. Elemental analysis of the product shows it to compare favorably with the theoretical analysis of 5,10-dihydrophenarsazine-10-isooctanoate.

PERCENT BY WEIGHT FOR 5,10-DIHYDROPHENARSAZINE-10-ISOOCTANOATE

|  | Found | Theoretical |
| --- | --- | --- |
| Carbon | 60.17 | 62.30 |
| Hydrogen | 6.11 | 6.23 |
| Oxygen | 8.76 | 8.31 |
| Arsenic | 20.31 | 19.47 |

EXAMPLE II (5,10-dihydrophenarsazine-10-decanoate)

A mixture of 7 grams (0.041 mole) of decanoic acid and 10.0 grams (0.02 mole) of 10,10'-oxybis(5,10-dihydrophenarsazine) dispersed in 500 milliliters of toluene was stirred and refluxed at about 110° C. in a flask connected to a reflux condenser by means of a Dean-Stark trap. The reaction was continued until all the water of reaction was collected in the trap. The solution which resulted was filtered and concentrated under vacuum to a volume of about 100 milliliters. Subsequent dilution of the concentrate with petroleum ether precipitated a crystalline product which melted at 78–83° C. with decomposition. Elemental analysis of the product shows it to compare favorably with the theoretical analysis of 5,10-dihydrophenarsazine-10-decanoate.

PERCENT BY WEIGHT FOR 5,10-DIHYDROPHENARSAZINE-10-DECANOATE

|  | Found | Theoretical |
| --- | --- | --- |
| Carbon | 63.12 | 63.90 |
| Hydrogen | 6.51 | 6.78 |
| Oxygen | 8.40 | 7.75 |

EXAMPLE III (5,10-dihydrophenarsazine-10-octanoate)

A mixture of 7.2 grams (0.05 mole) of octanoic acid and 12.5 grams (0.025 mole) of 10,10'-oxybis(5,10-dihydrophenarsazine) dispersed in 500 milliliters of toluene was stirred and refluxed at about 110° C. in a flask connected to a reflux condenser by means of a Dean-Stark trap. The reaction was continued until all the water of reaction was collected in the trap. The solution which resulted was filtered and concentrated under vacuum to a volume of about 100 milliliters. Subsequent dilution of the concentrate with petroleum ether precipitated a crystalline product which melted at 102–104° C. with decomposition. Elemental analysis of the product shows it to compare favorably with the theoretical analysis of 5,10-dihydrophenarsazine-10-octanoate.

PERCENT BY WEIGHT FOR 5,10-DIHYDROPHENARSAZINE-10-OCTANOATE

|  | Found | Theoretical |
|---|---|---|
| Carbon | 61.88 | 62.30 |
| Hydrogen | 6.12 | 6.23 |
| Oxygen | 8.51 | 8.31 |

EXAMPLE IV (5,10-dihydrophenarsazine-10-benzoate)

A mixture of 278 grams (1.0 mole) of 10-chloro-5,10-dihydrophenarsazine, 144 grams (1.0 mole) of sodium benzoate and 3 liters of toluene was stirred and refluxed in a flask at about 110° C. for 2 hours. The dark brown mixture which resulted was filtered while hot. Subsequent chilling of the filtrate precipitated a tan crystalline product which melted at 204–6° C. with decomposition. Elemental analysis of the product shows it to compare favorably with the theoretical analysis of 5,10-dihydrophenarsazine-10-benzoate.

PERCENT BY WEIGHT FOR 5,10-DIHYDROPHENARSAZINE-10-BENZOATE

|  | Found | Theoretical |
|---|---|---|
| Carbon | 62.80 | 62.75 |
| Hydrogen | 3.83 | 3.87 |
| Oxygen | 8.35 | 8.82 |
| Arsenic | 20.98 | 20.65 |

EXAMPLE V (5,10-dihydrophenarsazine-10-valerate)

A mixture of 10.2 grams (0.1 mole) of valeric acid and 12.5 grams (0.25 mole) of 10,10′-oxybis(5,10-dihydrophenarsazine) in 500 milliliters of chloroform was stirred and refluxed at about 60° C. in a flask equipped with a modified Dean-Stark trap to collect the water formed in the reaction. The reaction was continued until no more water was collected. The light brown solution which resulted was filtered and concentrated under vacuum to a volume of about 100 milliliters. Subsequent dilution of the concentrate with petroleum ether precipitated a tan crystalline product. The product melted at 128–30° C. with decomposition. Elemental analysis of the tan crystalline product shows it to compare favorably with the theoretical analysis of 5,10-dihydrophenarsazine-10-valerate.

PERCENT BY WEIGHT FOR 5,10-DIHYDROPHENARSAZINE-10-VALERATE

|  | Found | Theoretical |
|---|---|---|
| Carbon | 59.64 | 59.45 |
| Hydrogen | 4.78 | 5.25 |
| Oxygen | 9.40 | 9.33 |

In the following examples, the compounds were prepared in 500 milliliters of chloroform according to the general procedure described in Example V. After concentration of the filtrate under vacuum, the product either precipitated or was caused to precipitate by dilution with petroleum ether.

EXAMPLE VI (5,10-dihydrophenarsazine-10-crotonate)

5,10-dihydrophenarsazine-10-crotonate was prepared by refluxing a mixture of 5.16 grams (0.06 mole) of crotonic acid and 15.0 grams (0.03 mole) of 10,10′-oxybis(5,10-dihydrophenarsazine) in 500 milliliters of chloroform. The product melted at 232–234° C. with decomposition. Elemental analysis of the product shows it to compare favorably with the theoretical analysis of 5,10-dihydrophenarsazine-10-crotonate.

PERCENT BY WEIGHT FOR 5,10-DIHYDROPHENARSAZINE-10-CROTONATE

|  | Found | Calculated |
|---|---|---|
| Carbon | 58.15 | 58.70 |
| Hydrogen | 4.35 | 4.28 |
| Oxygen | 9.67 | 9.78 |

EXAMPLE VII (5,10-dihydrophenarsazine-10-hexanoate 5,10-dihydrophenarsazine-10-hexanoate was prepared by refluxing a mixture of 11.6 grams (0.1 mole) of hexanoic acid and 12.5 grams (0.025 mole) of 10,10′-oxybis-(5,10-dihydrophenarsazine) in 500 milliliters of chloroform. The product melted at 151–153° C. with decomposition. Elemental analysis of the product shows it to compare favorably with the theoretical analysis of 5,10-dihydrophenarsazine-10-hexanoate.

PERCENT BY WEIGHT FOR 5,10-DIHYDROPHENARSAZINE-10-HEXANOATE

|  | Found | Calculated |
|---|---|---|
| Carbon | 60.85 | 60.50 |
| Hydrogen | 5.53 | 5.60 |
| Oxygen | 10.00 | 8.96 |

EXAMPLE VIII (5,10-dihydrophenarsazine-10-[10-undecenoate])

5,10-dihydrophenarsazine-10-[10-undecenoate] was prepared by refluxing a mixture of 18.4 grams (0.1 mole) of 10-undecenoic acid and 12.5 grams (0.025 mole) of 10,10′-oxybis(5,10-dihydrophenarsazine) in 500 milliliters of chloroform. The product melted at 68–71° C. with decomposition. Elemental analysis of the product shows it to compare favorably with the theoretical analysis of 5,10-dihydrophenarsazine-10-[10-undecenoate].

PERCENT BY WEIGHT FOR 5,10-DIHYDROPHENARSAZINE-10-[10-UNDECENOATE]

|  | Found | Calculated |
|---|---|---|
| Carbon | 64.54 | 65.00 |
| Hydrogen | 6.64 | 6.59 |
| Oxygen | 7.20 | 7.53 |

EXAMPLE IX (5,10-dihydrophenarsazine-10-[p-toluate])

5,10-dihydrophenarsazine-10-[p-toluate] was prepared by refluxing a mixture of 8.11 grams (0.06 mole) of p-toluic acid and 15.0 grams (0.03 mole) of 10,10′-oxybis-(5,10-dihydrophenarsazine) in 500 milliliters of chloroform. The product melted at 174–176° C. with decomposition. Elemental analysis of the product shows it to compare favorably with the theoretical analysis of 5,10-dihydrophenarsazine-10-[p-toluate].

PERCENT BY WEIGHT FOR 5,10-DIHYDROPHENARSAZINE-10-[p-TOLUATE]

|  | Found | Calculated |
|---|---|---|
| Carbon | 60.45 | 63.70 |
| Hydrogen | 4.03 | 4.25 |
| Oxygen | 10.00 | 8.48 |

EXAMPLE X (5,10-dihydrophenarsazine-10-phenylacetate)

5,10-dihydrophenarsazine - 10 - phenylacetate was prepared by refluxing a mixture of 8.2 grams (0.06 mole) of phenylacetic acid and 15.0 grams (0.03 mole) of 10,10′-oxybis(5,10-dihydrophenarsazine) in 500 milliliters of chloroform. The product melted at 179–180° C. with decomposition. Elemental analysis of the product shows it to compare favorably with the theoretical analysis of 5,10-dihydrophenarsazine-10-phenylacetate.

PERCENT BY WEIGHT FOR 5,10-DIHYDROPHENARSAZINE-10-PHENYLACETATE

|  | Found | Calculated |
|---|---|---|
| Carbon | 63.03 | 63.70 |
| Hydrogen | 4.26 | 4.24 |
| Oxygen | 8.69 | 8.49 |

EXAMPLE XI (5,10-dihydrophenarsazine-10-phenoxyacetate)

5,10-dihydrophenarsazine-10-phenoxyacetate was prepared by refluxing a mixture of 9.2 grams (0.06 mole) of phenoxyacetic acid and 15.0 grams (0.03 mole) of 10,10'-oxybis(5,10-dihydrophenarsazine) in 500 milliliters of chloroform. The product melted at 190–192° C. with decomposition. Elemental analysis of the product shows it to compare favorably with the theoretical analysis of 5,10-dihydrophenarsazine-10-phenoxyacetate.

PERCENT BY WEIGHT FOR 5,10-DIHYDROPHENARSAZINE-10-PHENOXYACETATE

|  | Found | Calculated |
|---|---|---|
| Carbon | 59.77 | 61.00 |
| Hydrogen | 4.14 | 4.07 |
| Oxygen | 12.30 | 12.12 |

Other phenarsazine compounds of the invention can be similarly prepared from a phenarsazine oxide and the appropriate carboxylic acid or from a phenarsazine chloride and a sodium salt of the acid according to the procedure disclosed hereinabove.

In order to illustrate the utility of the phenarsazine compounds according to the invention, representative compounds were tested as fungicides for controlling the soil-dwelling fungi. Pythium aphanidermatum. In making the fungicidal tests, 190 mg. of the phenarsazine compound are thoroughly mixed with 750 grams of dry sandy clay loam soil infested principally with Pythium aphanidermatum. This admixture corresponds to an application rate of 100 pounds of phenarsazine compound per acre. Additional tests are made at application rates of 50, 25, 12½ and 6¼ pounds per acre. The treated soil is divided into two portions which are placed in two 8-ounce waxed cardboard cartons. Five pea seeds are planted one-half inch deep in the soil in each carton. The cartons containing the planted peas are water and incubated at 65° F. for 9 days. The planted peas are then examined and compared with peas planted in sterile soil and incubated under the same conditions. The effect of the tested compound on the planted peas is determined with respect to the number of healthy plants produced and also with respect to indications of phytotoxicity, i.e., indications of interference with germination of growth. The rating is written as a fraction wherein the number in the numerator is the healthy plant survival rating (fungus control) and the number in the denominator is the phytotoxicity rating. The schedule for rating the plants is as follows:

Healthy plant survival rating (both cartons)

| Number of healthy plants: | Rating |
|---|---|
| 0 | 0 |
| 1–3 | 1 |
| 4–6 | 2 |
| 7–9 | 3 |
| 10 | 4 |

Phytotoxicity rating

| Condition: | Rating |
|---|---|
| Seed not germinated | — |
| Radicle protruding from seed | 1 |
| Slight growth of root | 2 |
| Medium growth of root | 3 |
| Growth equal to standard in sterile soil | 4 |

The results of the fungicidal tests with the representative phenarsazine compounds are recorded in Table I.

TABLE I.—FUNGICIDAL ACTIVITY OF PHENARSAZINE COMPOUNDS AGAINST PYTHIUM ROOT-ROTTING ORGANISMS OF PEAS

| Compound | Rating at pounds per acre of— | | | | |
|---|---|---|---|---|---|
|  | 100 | 50 | 25 | 12½ | 6¼ |
| 5,10-dihydrophenarsazine-10-propionate | 4/4 | 4/4 | 4/4 | 3/4 | 2/4 |
| 5,10-dihydrophenarsazine-10-butyrate | 4/4 | 3/4 | 3/4 | 3/4 | 2/4 |
| 5,10-dihydrophenarsazine-10-crotonate | 4/4 | 4/4 | 4/4 | 4/4 | 3/4 |
| 5,10-dihydrophenarsazine-10-valerate | 4/4 | 4/4 | 3/4 | 3/4 | 1/4 |
| 5,10-dihydrophenarsazine-10-pivalate | 4/4 | 4/4 | 4/4 | 4/4 | 3/4 |
| 5,10-dihydrophenarsazine-10-hexanoate | 4/4 | 3/4 | 3/4 | 2/4 | 1/4 |
| 5,10-dihydrophenarsazine-10-octanoate | 4/4 | 3/4 | 3/4 | 3/4 | 3/4 |
| 5,10-dihydrophenarsazine-10-isooctanoate | 4/4 | 4/4 | 4/4 | 4/4 | 4/4 |
| 5,10-dihydrophenarsazine-10-decanoate | 4/4 | 4/4 | 3/4 | 4/4 | 3/4 |
| 5,10-dihydrophenarsazine-10-[10-undecenoate] | 4/4 | 4/4 | 3/4 | 2/4 | 2/4 |
| 5,10-dihydrophenarsazine-10-benzoate | 4/4 | 4/4 | 4/4 | 4/4 | 3/4 |
| 5,10-dihydrophenarsazine-10-salicylate | 4/4 | 4/4 | 4/4 | 4/4 | 3/4 |
| 5,10-dihydrophenarsazine-10-[p-toluate] | 4/4 | 4/4 | 4/4 | 4/4 | 3/4 |
| 5,10-dihydrophenarsazine-10-phenylacetate | 4/4 | 3/4 | 3/4 | 3/4 | 3/4 |

It is apparent from the data in Table I that the phenarsazine compounds cause no chemical injury of the plants, the phytotoxicity rating as shown in the denominator of the fraction being 4 in every instance. It is also evident that the phenarsazine compounds are effective fungicides in that a maximum survival rating was obtained in every instance at an application rate of 100 pounds per acre. It will be noted further that the phenarsazine compounds for the most part arso also effective fungicides when used at lower application rates of 6¼ to 50 pounds per acre. While the valerate and hexanoate derivatives were not as effective at a rate of 6¼ pounds per acre as the other phenarsazine compounds, even these derivatives were quite effective at higher rates. Of the compounds listed in Table I, it will be noted that the crotonate, pivalate, octanoate, isooctanoate, decanoate, benzoate, salicylate, p-toluate and phenylacetate were extremely effective fungicides in that they had survival ratings of 3 or 4 even at an application rate of 6¼ pounds per acre. The isooctanoate derivative of phenarsazine was an extraordinarily good fungicide as evidenced by its 4/4 rating at application rates of 6¼ to 100 pounds per acre.

While our invention has been described with reference to various specific examples and embodiments, it will be understood that the invention is not limited to such examples and embodiments and may be variously practiced within the scope of the claims hereinafter made.

We claim:

1. The method for controlling soil-dwelling fungi which comprises impregnating soil infested with fungi with a fungicidally effective amount of a phenarsazine compound having the formula:

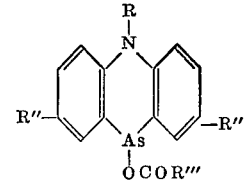

wherein R and R'' are hydrogen; and R''' is selected from the group consisting of alkenyl and branched-chain alkyl radicals containing from 3 to 9 carbon atoms and phenyl, hydroxyphenyl, alkylphenyl and phenalkyl radicals wherein the alkyl portions of said alkylphenyl and phenalkyl radicals contain from 1 to 2 carbon atoms.

2. The method of claim 1 in which said phenarsazine compound is 5,10-dihydrophenarazine-10-crotonate.

3. The method of claim 1 in which said phenarasazine compound is 5,10-dihydrophensarsazine-10-pivalate.

4. The method of claim 1 in which said phenarsazine compound is 5,10-dihydrophenarsazine-10-isooctanoate.

5. The method of claim 1 in which said phenarsazine compound is 5,10-dihydrophenarsazine-10-benzoate.

6. The method of claim 1 in which said phenarsazine compound is 5,10-dihydrophenarsazine-10-salicylate.

7. The method of claim 1 in which said phenarsazine compound is 5,10-dihydrophenarsazine-10-[p-toluate].

8. The method of claim 1 in which said phenarsazine compound is 5,10-dihydrophenarsazine-10-phenylacetate.

References Cited

Chemical Abstracts: Nagasawa et al., 1958, vol. 52, pp. 10483i and 10484a.

Chemical Abstracts: Fukunaga et al., 1959, vol. 54, p. 7056f.

STANLEY J. FRIEDMAN, Primary Examiner

D. R. ORE, Assistant Examiner

U.S. Cl. X.R.

260—404